United States Patent
Caplan et al.

(10) Patent No.: US 7,585,159 B2
(45) Date of Patent: Sep. 8, 2009

(54) AUTOMOTIVE ENGINE-COOLING FAN ASSEMBLY

(75) Inventors: Mark D. Caplan, Westborough, MA (US); Wolfgang Kehrer, Newton, MA (US); Martin G. Yapp, Needham, MA (US)

(73) Assignee: Robert Bosch GmbH, Stuttgart (DE)

( * ) Notice: Subject to any disclaimer, the term of this patent is extended or adjusted under 35 U.S.C. 154(b) by 663 days.

(21) Appl. No.: 10/832,686

(22) Filed: Apr. 27, 2004

(65) Prior Publication Data

US 2004/0223845 A1    Nov. 11, 2004

Related U.S. Application Data

(60) Provisional application No. 60/466,139, filed on Apr. 28, 2003.

(51) Int. Cl.
   F04B 39/06    (2006.01)
   B63H 1/16     (2006.01)
   A47C 7/74     (2006.01)

(52) U.S. Cl. .................. 417/368; 416/179; 416/169 A (58) Field of Classification Search .............. 417/423.8, 417/368, 370, 169 A, 183, 185, 180, 197 R, 417/223 B, 423.7, 423.14, 423.1; 416/176, 416/189, 216, 236, 245 R; 415/173.1
See application file for complete search history.

(56) References Cited

U.S. PATENT DOCUMENTS

| | | | | | |
|---|---|---|---|---|---|
| 3,937,595 | A | * | 2/1976 | English et al. | 416/244 R |
| 4,245,957 | A | * | 1/1981 | Savage et al. | 416/135 |
| 4,923,365 | A | * | 5/1990 | Rollwage | 415/119 |
| 5,193,981 | A | * | 3/1993 | Scheidel et al. | 416/179 |
| 5,326,225 | A | * | 7/1994 | Gallivan et al. | 416/179 |
| 5,437,541 | A | * | 8/1995 | Vainrub | 416/223 R |
| 5,577,888 | A | * | 11/1996 | Capdevila et al. | 415/210.1 |
| 5,730,583 | A | * | 3/1998 | Alizadeh | 416/189 |
| 5,871,335 | A | * | 2/1999 | Bartlett | 416/244 R |
| 5,967,764 | A | * | 10/1999 | Booth et al. | 417/423.8 |
| 6,065,937 | A | * | 5/2000 | Hunt | 416/189 |

FOREIGN PATENT DOCUMENTS

EP    0 704 626    4/1996

(Continued)

OTHER PUBLICATIONS

FIG. 1 is a cross-sectional view of an admitted prior art automotive engine-cooling fan assembly. (Statement of Relevance attached), Aug. 13, 2004.

(Continued)

*Primary Examiner*—Charles G Freay
*Assistant Examiner*—Alexander B Comley
(74) *Attorney, Agent, or Firm*—Michael Best & Friedrich LLP (57) ABSTRACT

The present invention provides an automotive engine-cooling fan assembly including a motor having a driveshaft defining a central axis, and a fan driven by the motor. The fan includes an inner hub portion coupled to the driveshaft, and an outer hub portion coupled to the inner hub portion. The outer hub portion is coupled to a plurality of radially-extending blades. The fan also includes a plurality of vibration isolation members interconnecting the inner hub portion and the outer hub portion.

33 Claims, 6 Drawing Sheets

FOREIGN PATENT DOCUMENTS

EP          0 992 692        4/2000

OTHER PUBLICATIONS

FIG. 2 is an enlarged cross-sectional view of a portion of the admitted prior art fan assembly of FIG. 1 taken along section line 2-2 in FIG. 3, illustrating a fan hub coupled to a driveshaft of a motor. (Statement of Relevance attached), Aug. 13, 2004.
FIG. 3 is a front view of the fan hub illustrated in FIG. 2. (Statement of Relevance attached), Aug. 13, 2004.
Annotated Drawing of Automotive HVAC Blower, Nov. 23, 2005.
Photos of Automotive HVAC Blower Fan, Nov. 23, 2005.

\* cited by examiner

AUTOMOTIVE ENGINE-COOLING FAN ASSEMBLY

RELATED APPLICATIONS

This application claims priority to U.S. Provisional Patent Application Ser. No. 60/466,139 filed on Apr. 28, 2003, which is incorporated herein by reference.

FIELD OF THE INVENTION

The present invention relates generally to fan assemblies, and more particularly to automotive engine-cooling fan assemblies.

BACKGROUND OF THE INVENTION

Typical automotive engine-cooling fan assemblies include an electric motor having a driveshaft coupled to a fan. The typical fan includes a hub which extends from the driveshaft to the roots of fan blades extending from the hub. The hub typically has a face portion which extends radially outwardly from the driveshaft attachment to a cylindrical portion to which the fan blades are attached. To conserve axial space, the motor is typically positioned on the concave side of the hub such that at least a portion of the motor is within the cylindrical portion of the hub. An opposite or a convex side of the hub guides air toward the fan blades.

Radial ribs are incorporated with the hub to stiffen the fan structure. Centrifugal forces on the fan blades and the rotating band (if one is used) tend to deform the hub. This effect can be decreased by placing ribs on an interior surface of the face portion and on an interior surface of the cylindrical portion. If a ventilated or air-cooled motor is employed, the ribs may also help cool the motor. The region between the face of the motor and the face of the hub, including the ribs, acts like a centrifugal fan to pull cooling air through the motor.

Figure 1:
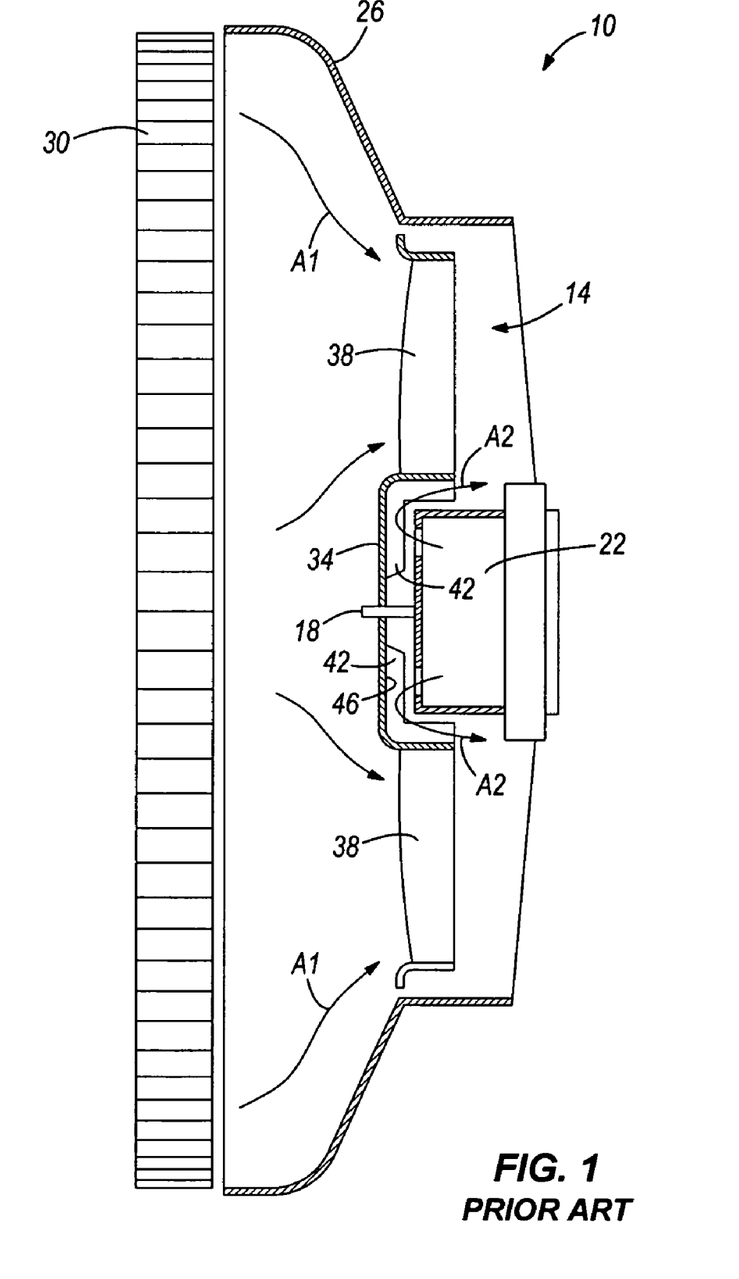
FIG. 1 is a cross-sectional view of a prior art automotive engine-cooling fan assembly.
Figure 2:
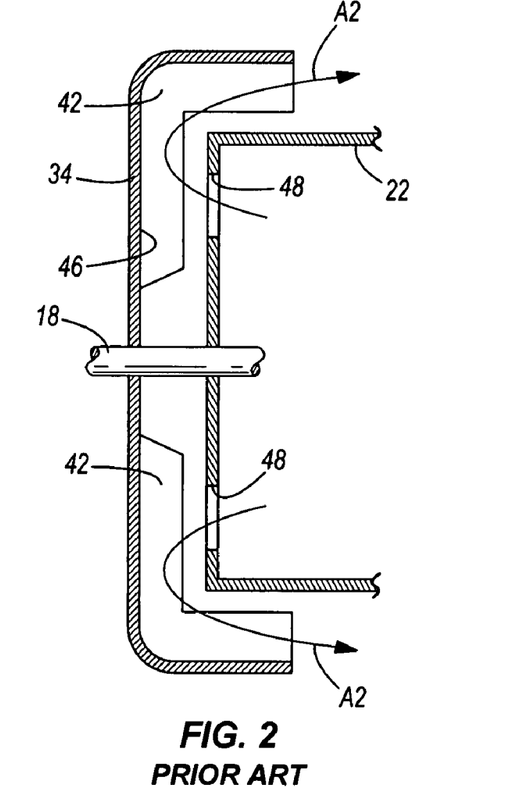
FIG. 2 is an enlarged cross-sectional view of a portion of the prior art fan assembly of FIG. 1 taken along section line 2-2 in FIG. 3, illustrating a fan hub coupled to a driveshaft of a motor.
Figure 3:
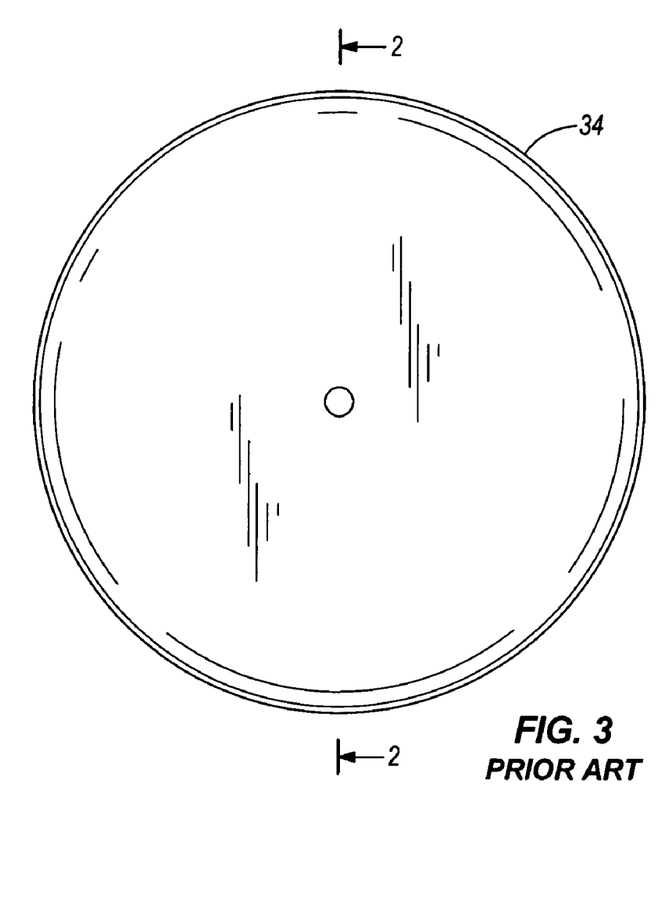
FIG. 3 is a front view of the fan hub illustrated in FIG. 2.

FIGS. 1-3 illustrate a prior art automotive engine-cooling fan assembly 10. The prior art fan assembly 10 includes a fan 14 mounted to a driveshaft 18 of a motor 22, which is supported by a fan shroud 26. The fan shroud 26 is positioned adjacent a heat exchanger 30 (e.g., a radiator), such that rotation of the fan 14 generates an airflow A1 through the heat exchanger 30. The fan 14 includes a hub 34 coupled to the driveshaft 18 for rotation with the driveshaft 18. The fan 14 also includes a plurality of blades 38 radially extending from the hub 34.

FIGS. 1 and 2 illustrate a plurality of radially-extending ribs 42 attached to an interior surface 46 of the hub 34. The ribs 42 attach over their entire extent to the interior surface 46 of the hub 34 and the ribs 42 are evenly distributed about the hub 34 to structurally reinforce the hub 34.

The ribs 42 axially extend toward the motor 22 to within a running clearance of the motor 22. The ribs 42, upon rotation of the fan 14, function as a centrifugal fan to generate an airflow A2 through the motor 22, which is air-cooled and ventilated through apertures 48.

SUMMARY OF THE INVENTION

It is desirable when designing an automotive engine-cooling fan assembly to minimize noise and vibration. Some engine-cooling fan assemblies may suffer from higher than desirable levels of noise, vibration, and harshness ("NVH") caused by, for example, motor cogging torque, axial cogging forces, torque ripple, and axial ripple forces which can excite resonant modes in the fan structure.

The automotive engine-cooling fan assembly of the present invention decreases the excitation of torsional and axial modes of vibration of the fan while maintaining the air-moving performance, structural integrity, motor-cooling airflow, and low cost of the fan.

The present invention provides, in one aspect, an automotive engine-cooling fan assembly including a motor having a driveshaft defining a central axis, and a fan driven by the motor. The fan includes an inner hub portion coupled to the driveshaft, and an outer hub portion coupled to the inner hub portion. The outer hub portion is coupled to a plurality of radially-extending blades. The fan also includes a plurality of vibration isolation members interconnecting the inner hub portion and the outer hub portion.

The present invention provides, in another aspect, an automotive engine-cooling fan assembly including a fan and a motor having a driveshaft. The fan includes a hub and radially extending blades. The hub includes a radially extending face coupled to the driveshaft and an axially extending outer portion to which the blades are integrally attached. The hub further includes a plurality of radial ribs attached to an interior surface of the face and the outer portion of the hub. The ribs have unattached portions between the face and the outer portion of the hub. The face is connected to the outer portion of the hub only through the ribs.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items.

DETAILED DESCRIPTION

Figure 4:
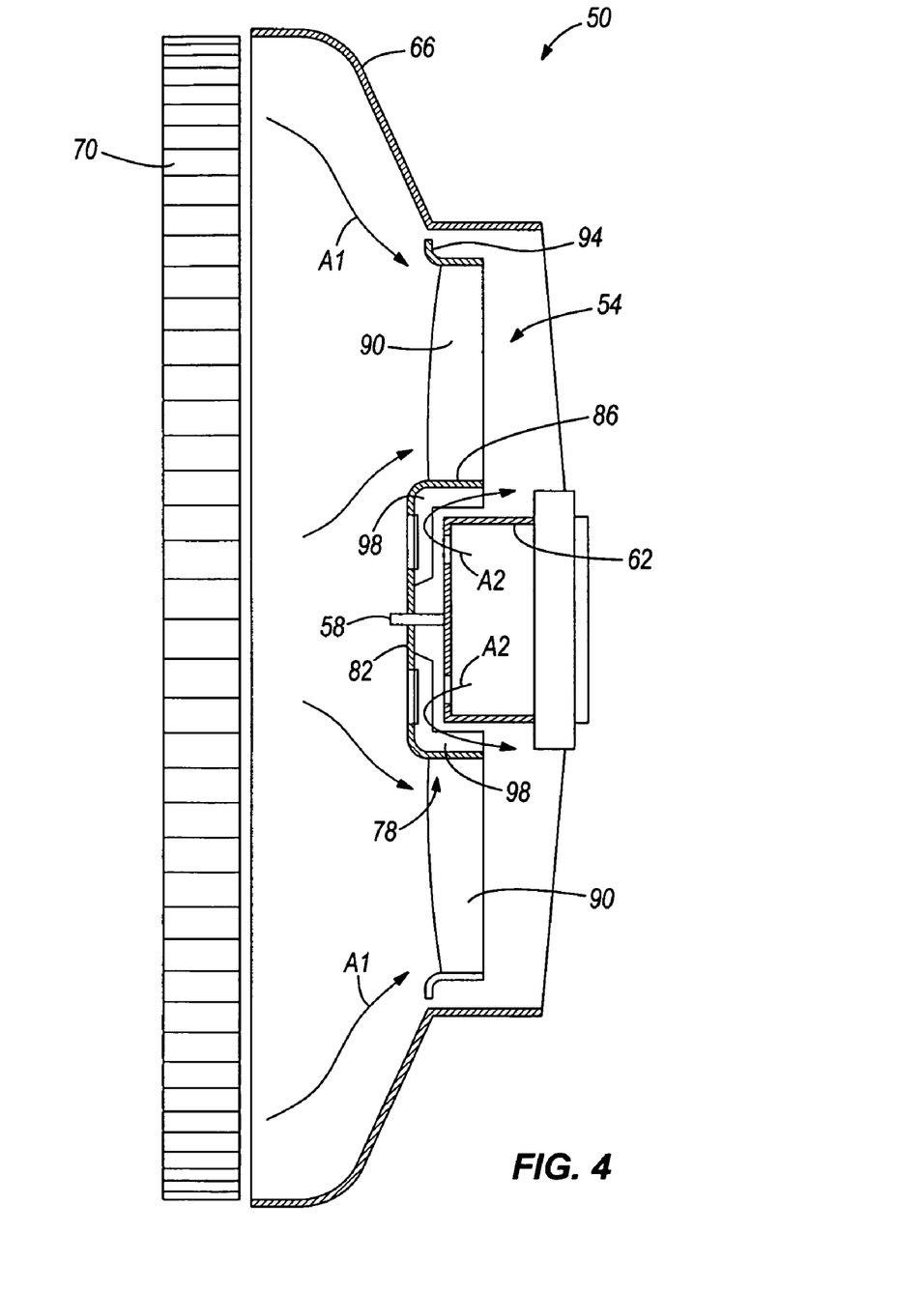
FIG. 4 is a cross-sectional view of an automotive engine-cooling fan assembly of the present invention.

FIG. 4 illustrates an automotive engine-cooling fan assembly 50 of the present invention. The fan assembly 50 includes a fan 54 mounted to a driveshaft 58 of a motor 62, which may be supported by a fan shroud 66 or another structure. The fan shroud 66 is positioned adjacent a heat exchanger 70 (e.g., a radiator), such that rotation of the fan 54 about a central axis 74 (see FIG. 5) of the driveshaft 58 generates an airflow A1 through the heat exchanger 70.

The fan 54 includes a hub 78 having an inner hub portion 82 and an outer hub portion 86. The inner hub portion 82 defines a substantially planar face that extends radially with respect to the central axis 74 and is coupled to the driveshaft 58 for rotation with the driveshaft 58. The inner hub portion 82 may be coupled to the driveshaft 58 using any of a number of components and methods known in the art. Although the illustrated inner hub portion 82 is shown directly coupled to the driveshaft 58, it should be understood that an adapter may also be used to couple the inner hub portion 82 and the driveshaft 58. Although the inner hub portion 82 is illustrated in FIGS. 4-7 as being substantially flat or planar, the inner hub portion 82 may have a conical shape. Such a shape may minimize fan warpage after molding and may allow flexibility in positioning the motor 62. Also, a conical inner hub portion may have a cone angle in either the upstream or downstream direction with respect to the direction of airflow A1.

The outer hub portion 86 extends both radially and axially with respect to the central axis 74. As shown in FIG. 4, the fan 54 also includes a plurality of blades 90 radially extending from an axially-extending or a cylindrical portion of the outer hub portion 86. The blades 90 are interconnected at their tips by a rotating band 94 extending circumferentially around the fan 54. The rotating band 94 may help stabilize the tips of the blades 90, however, alternative constructions of the fan 54 may not utilize the rotating band 94.

Figure 5:
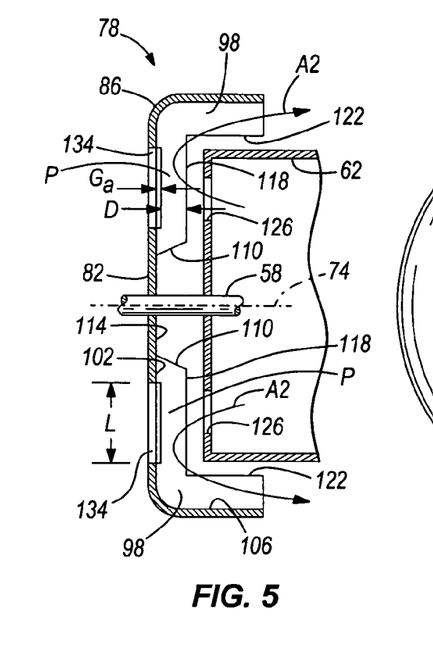
FIG. 5 is an enlarged cross-sectional view of a portion of the fan assembly of FIG. 4 taken along section line 5-5 in FIG. 6, illustrating a fan hub coupled to a driveshaft of a motor.
Figure 6:
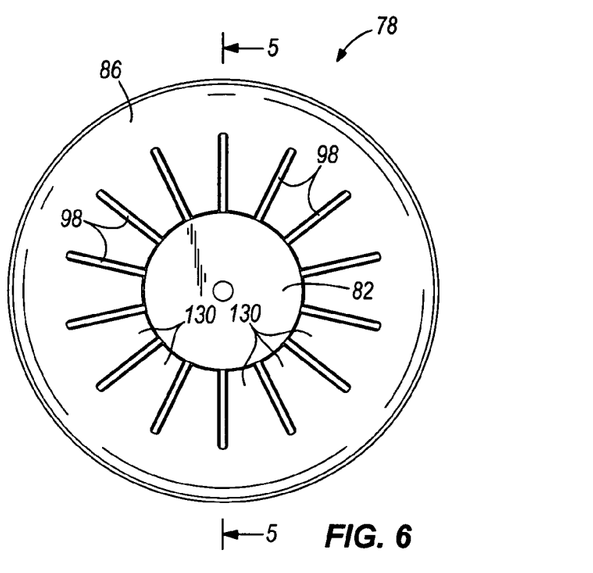
FIG. 6 is a front view of the fan hub illustrated in FIG. 5.

With reference to FIG. 5, the fan 54 further includes a plurality of vibration isolation members or ribs 98 attached to an interior surface 102 of the inner hub portion 82 and an interior surface 106 of the outer hub portion 86 to interconnect the inner hub portion 82 and the outer hub portion 86. The ribs 98 extend radially along the interior surface 102 of the inner hub portion 82. The ribs 98 also extend both radially and axially along the interior surface 106 of the outer hub portion 86. As such, the ribs 98 are generally L-shaped as shown in FIG. 5, however, other shapes may be utilized to conform with the shape of the hub 78. In the illustrated construction, the ribs 98 are evenly distributed about the hub 78 to structurally reinforce the inner hub portion 82 and the outer hub portion 86.

The ribs 98 include radially innermost edges 110 spaced from the driveshaft 58 of the motor 62. As such, the inner hub portion 82 includes a substantially planar central region 114 without ribs surrounding the driveshaft 58. The ribs 98 also include radially-extending free edges 118 spaced from the motor 62, and axially-extending free edges 122 spaced from the motor 62. More particularly, the radially-extending free edges 118 may be axially spaced from the motor 62 by a running clearance of about 3 mm or less. Alternatively, the radially-extending free edges 118 may be axially spaced from the motor 62 by a running clearance of about 6 mm or less. In the illustrated construction, the running clearance between the axially-extending free edges 122 of the ribs 98 is slightly greater than the running clearance between the radially-extending free edges 118 of the ribs 98 and the motor 62. Alternatively, the running clearance between the axially-extending free edges 122 of the ribs 98 and the motor 62 may be substantially greater than or less than the running clearance between the radially-extending free edges 18 of the ribs 98 and the motor 62.

The ribs 98 function as centrifugal fan blades during rotation of the fan 54 to generate an airflow A2 through the motor 62, which is air-cooled and ventilated through apertures 126.

Figure 7:
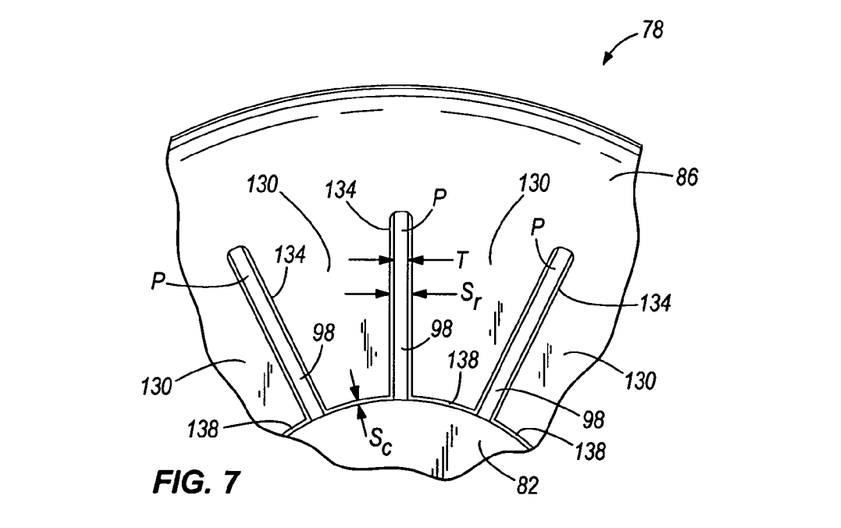
FIG. 7 is an enlarged partial view of the fan hub illustrated in FIG. 6.

With reference to FIGS. 5 and 7, it can be seen that the ribs 98 are the only structure interconnecting the inner and outer hub portions 82, 86. As shown in FIG. 5, portions P of the ribs 98 are not directly attached to either of the inner hub portion 82 or the outer hub portion 86. The portions P of the ribs 98 not attached to either of the inner hub portion 82 or the outer hub portion 86 are axially spaced from the interior surface 102 of the inner hub portion 82 by an axial gap $G_a$.

As shown in FIG. 7, the outer hub portion 86 includes a plurality of projections 130 extending between adjacent ribs 98. Adjacent projections 130 are separated by radially-extending slots 134 that are aligned with the unattached portions P of the ribs 98. In the illustrated construction, the width $S_r$ of the slots 134 is only slightly greater than the thickness T of the ribs 98 (as measured at the unattached portions P of the ribs 98). The width $S_r$ of the slots 134 is sufficiently large enough to assure that the ribs 98 are separated from the adjacent projections 130 of the outer hub portion 86. In the illustrated construction, the thickness T of the ribs 98 is about 2 mm or less. Alternatively, the thickness T of the ribs 98 may be about 3.5 mm or less. The slots 134 also allow the axial gaps $G_a$ (see FIG. 5) to be formed without having action in the mold (e.g., no moving parts are required in the mold).

With continued reference to FIG. 5, the slots 134 have a radial length L that substantially coincides with the length of the unattached portions P of the ribs 98. In the illustrated construction, the radial length L of the slots 134 is at least 5 times greater than the thickness T of the ribs 98, and the radial length of the unattached portion P of the ribs 98 is at least 5 times greater than the thickness T of the ribs 98. Also, with reference to FIG. 5, the depth D of the ribs 98 (as measured at the unattached portions P of the ribs 98) is at least twice the thickness T of the ribs 98. The depth D of the ribs 98 is significantly larger than the thickness T of the ribs 98, so that the hub 78 has a greater axial stiffness than a torsional stiffness.

With reference to FIG. 7, a circumferential gap 138 exists between each of the projections 130 and the inner hub portion 82. The radially-inner ends of the radially-extending slots 134 open into the respective circumferential gaps 138. In the illustrated construction, the width $S_c$ of the gaps 138 is relatively small so that the opening through which air can flow through the circumferential gaps 138 is relatively small. As such, the airflow A1 through the fan blades 90 (see FIG. 4) and the motor-cooling airflow A2 generated by the ribs 98 are largely unaffected by the circumferential gaps 138 and the radially-extending slots 134.

As shown in FIG. 7, the gaps 138 are radially located relatively close to the radially-innermost edges 110 of the ribs 98. This substantially minimizes the open area resulting from a given width $S_c$ of the gaps 138. Alternatively, the circumferential gaps 138 may be spaced farther from the radially-innermost edges 110 of the ribs 98. Such a location of the gaps 138 may improve the cooling airflow A2 through the motor 62. Further, the gaps 138 may alternatively be spaced a variable distance from the radially-innermost edges 110 of the ribs 98 along the circumferential length of the gaps 138. In such a case, the width $S_c$ of the gaps should be sufficiently large to accommodate the maximum desired deflection of the ribs 98 upon rotation of the fan 54.

During operation of the fan 54, the ribs 98 function as vibration isolation members, or like flexible beams, which torsionally isolate the outer hub portion 86 and the fan blades 90 from the inner hub portion 82. In other words, the ribs 98 may deflect during rotation of the fan 54 to allow the outer hub portion 86 to rotate slightly relative to the inner hub portion 82. Such torsional isolation can reduce the radiated noise caused by motor cogging torque and torque ripple of the motor 62. The ribs 98 or vibration isolation members also effectively decrease the stiffness of the fan 54. As a result, the natural frequency of the fan 54 may be lowered below typical excitation frequencies that the fan 54 would normally experience during operation. In addition, the planar central region 114 of the inner hub portion 82 without ribs 98 may provide axial isolation of the outer hub portion 86 from the inner hub portion 82. Such axial isolation may substantially reduce the excitation of fan resonant modes by axial cogging and ripple forces of the motor 62.

Figure 8:
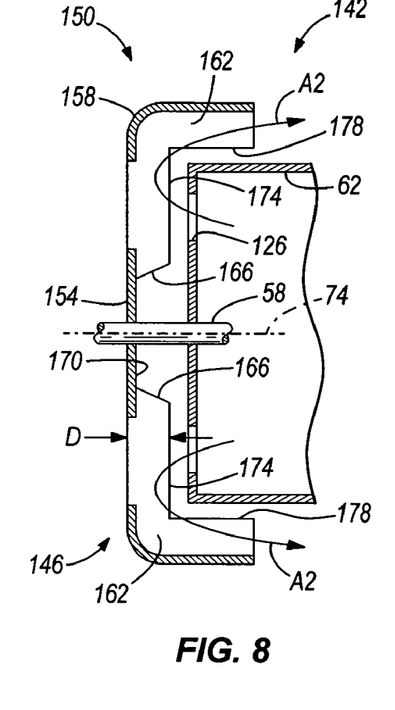
FIG. 8 is an enlarged cross-sectional view of a portion of a second construction of the fan assembly of the present invention taken along section line 8-8 in FIG. 9.
Figure 9:
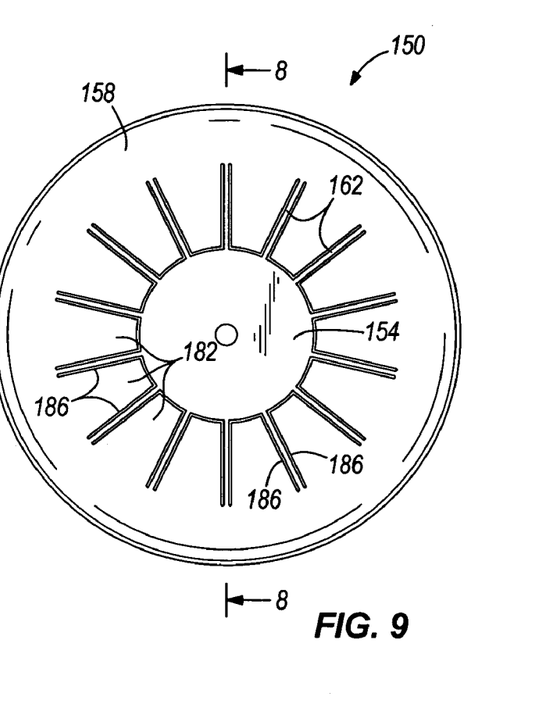
FIG. 9 is a front view of the fan hub illustrated in FIG. 8.
Figure 10:
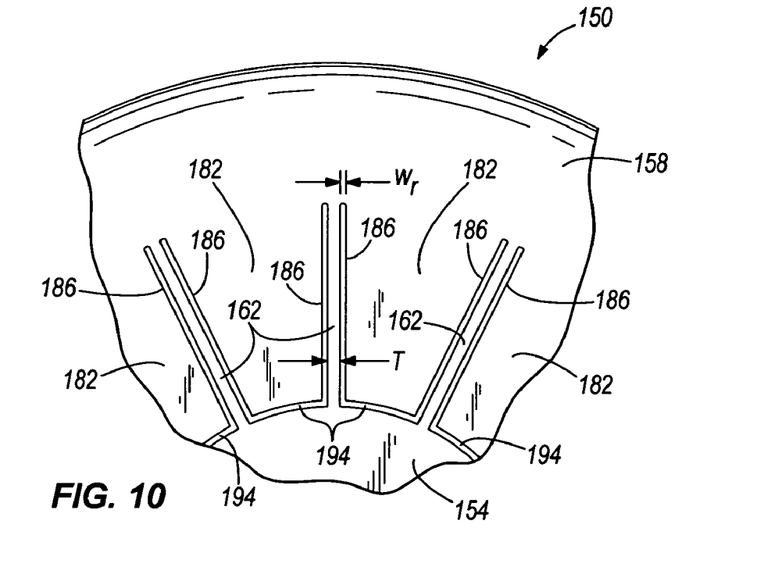
FIG. 10 is an enlarged partial view of the fan hub illustrated in FIG. 9.

FIGS. 8-10 illustrate another construction of an automotive engine-cooling fan assembly 142 of the present invention. The fan assembly 142 includes a fan 146 (only a portion of which is shown) mounted to the driveshaft 58 of the motor 62 in a similar fashion as the fan 54 of FIGS. 4-7. As such, like components will be labeled with like reference numerals.

The fan 146 includes a hub 150 having an inner hub portion 154 and an outer hub portion 158. The inner hub portion 154 defines a substantially planar or radial face that is coupled to the driveshaft 58 for rotation with the driveshaft 58. Although not shown in FIGS. 8-10, the fan 146 also includes a plurality of blades radially extending from the outer hub portion 158. Like the fan 54 of FIGS. 4-7, the blades of the fan 146 may be interconnected at their tips by a rotating band extending circumferentially around the fan 146.

The fan 146 further includes a plurality of vibration isolation members or ribs 162 attached to the inner hub portion 154 and the outer hub portion 158 to interconnect the inner hub portion 154 and the outer hub portion 158. Like the ribs 98 of FIGS. 4-7, the ribs 162 interconnect the inner hub portion 154 and the outer hub portion 158 such that the ribs 162 are the only structure interconnecting the inner and outer hub portions 154, 158. However, unlike the ribs 98, the ribs 162 are not configured with an axial gap between an interior surface of the hub 150 and the ribs 162.

With reference to FIG. 8, the ribs 162 include radially innermost edges 166 spaced from the driveshaft 58 of the motor 62. The inner hub portion 154 includes a substantially planar central region 170 without ribs 162 surrounding the driveshaft 58. The ribs 162 also include radially-extending free edges 174 and axially-extending free edges 178 spaced from the motor 62 by respective running clearances similar to that of the fan 54 of FIGS. 4-7. Like the ribs 98 of FIGS. 4-7, the ribs 162 function as a centrifugal fan during rotation of the fan 146 to generate an airflow A2 through the motor 62.

As shown in FIGS. 9 and 10, the outer hub portion 158 includes a plurality of projections 182 extending between adjacent ribs 162. Radially-extending slots 186 are defined between adjacent pairs of projections 182 and ribs 162. In the illustrated construction, the width $W_r$ of the slots 186 should be sufficiently wide to accommodate the torsional deflection of the outer hub portion 158 relative to the inner hub portion 154. The thickness T and depth D dimensions of the ribs 162 may be similar to those discussed above with reference to the ribs 98 of FIGS. 4-7.

Figure 11:
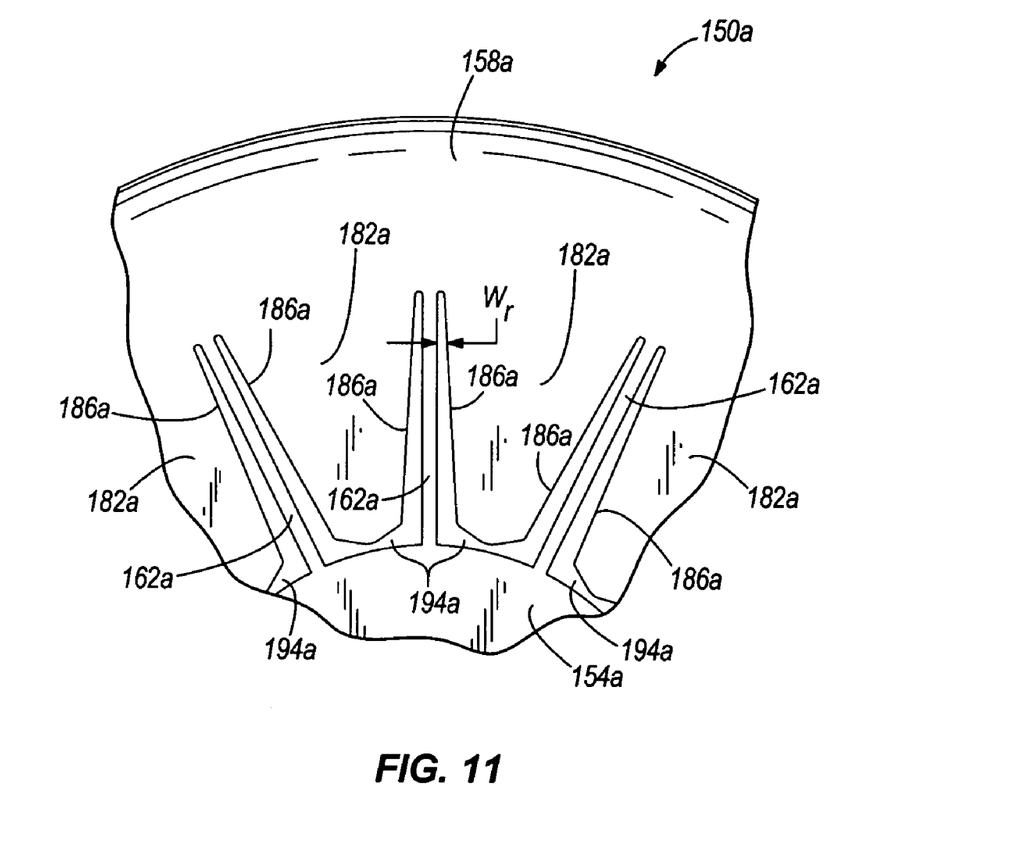
FIG. 11 is an enlarged partial view of an alternative construction of a fan hub of the fan assembly of FIG. 8.

With reference to FIG. 10, a circumferential gap 194 exists between each of the projections 182 and the inner hub portion 154. The radially-inner ends of the radially-extending slots 186 open up into the respective circumferential gaps 194. In the illustrated construction, the width $W_r$ of the radially-extending slots 186 is substantially constant over the radial length of the slots 186. Alternatively, as shown in an alternative construction of a fan hub 150$a$ in FIG. 11, the width $W_r$ of the radially-extending slots 186$a$ may be varied over the radial length of the slots 186$a$ to minimize the total opening area of the slots 186$a$ while accommodating the anticipated deflection of the ribs 162$a$ as a function of radial position. Like components are labeled with like reference numerals, with the letter "a."

In some cases it may be desirable to limit the deflection of the ribs 162. For example, the start-up torque of the motor 62 may be high enough such that without a limit, the ribs 162 may deflect excessively. Such a limit may be established by choosing the width $W_r$ of slots 186 to be large enough to accommodate deflection due to torque variations when the fan 146 is running or coasting down, but small enough to limit deflection of the ribs 162 at start-up. Alternatively, as shown in the alternative construction of the fan hub 150$a$ in FIG. 11, the shape of the circumferential gaps 194$a$ may be varied to limit the deflection of the ribs 162$a$.

During operation, the fan 146 operates in a substantially similar manner to the fan 54 of FIGS. 4-7. The ribs 162 function as vibration isolation members to torsionally isolate the outer hub portion 158 from motor cogging torque and torque ripple transmitted to the inner hub portion 154 from the motor 62. In addition, the planar central region 170 of the inner hub portion 154 without ribs 162 may provide axial isolation of the outer hub portion 158 from the inner hub portion 154. Such axial isolation may substantially reduce the excitation of fan resonant modes by axial cogging and ripple forces of the motor 62.

Various features of the invention are set forth in the following claims.

We claim:

1. An automotive engine-cooling fan assembly, comprising a motor having a driveshaft defining a central axis, and a fan driven by the motor, said fan comprising a plurality of generally radially-extending blades, and a hub, said hub comprising a generally radially-extending face portion defined along the entire radial extent of the hub; an axially-extending cylindrical portion; and ribs; said cylindrical portion being coupled to said blades; characterized in that said face portion is coupled directly, or through an adapter, to the driveshaft; and each of said ribs has a portion which extends radially along said face portion and a portion which extends axially along said cylindrical portion, said radially-extending portion of each of said ribs including a first edge in facing relationship with said motor and a second edge opposite said first edge and facing away from said motor, wherein said second edge of each of said ribs is unattached to said face portion.

2. The automotive engine-cooling fan assembly of claim 1, wherein the motor is a ventilated motor, and wherein the rib portions which extend radially along the hub face portion are spaced from the motor by a running clearance of less than about 6 mm to generate a cooling airflow through the motor.

3. The automotive engine-cooling fan assembly of claim 1, wherein the motor is a ventilated motor, and wherein the rib portions which extend radially along the hub face portion are spaced from the motor by a running clearance of less than about 3 mm to generate a cooling airflow through the motor.

4. The automotive engine-cooling fan assembly of claim 1, wherein the second edge of the ribs is spaced axially from the hub face portion.

5. The automotive engine-cooling fan assembly of claim 1, further comprising a plurality of radially-extending slots formed in the hub face portion, the plurality of radially-extending slots being aligned with the respective plurality of ribs.

6. The automotive engine-cooling fan assembly of claim 5, wherein the slots have a width greater than a thickness of the ribs.

7. The automotive engine-cooling fan assembly of claim 5, further comprising a plurality of slots, each of which extends at least a portion of the distance between adjacent radially-extending slots.

8. The automotive engine-cooling fan assembly of claim 5, further comprising a plurality of slots, each of which extends the entire distance between adjacent radially-extending slots.

9. The automotive engine-cooling fan assembly of claim 8, wherein the slots separate the hub into an inner hub portion and an outer hub portion, wherein the inner hub portion includes an inner portion of the hub face portion and the outer hub portion includes the cylindrical portion of the hub, and wherein the inner hub portion and the outer hub portion are connected only by the ribs.

10. The automotive engine-cooling fan assembly of claim 8, wherein the slots extending the entire distance between adjacent radially-extending slots are generally circumferential.

11. The automotive engine-cooling fan assembly of claim 7, wherein each of the plurality of slots extending at least a portion of the distance between adjacent radially-extending slots has a width that varies over the length of the slot.

12. The automotive engine-cooling fan assembly of claim 1, further comprising a plurality of radially-extending slots formed in the hub face portion, said slots being grouped in pairs with one slot on either side of each rib.

13. The automotive engine-cooling fan assembly of claim 12, wherein each of the slots has a width that varies over the length of the slot.

14. The automotive engine-cooling fan assembly of claim 12, further comprising a plurality of slots, each of which extends at least a portion of the distance between the radially-extending slot on one side of one of said ribs and the radially-extending slot on the opposite side of an adjacent rib.

15. The automotive engine-cooling fan assembly of claim 12, further comprising a plurality of slots, each of which extends from the radially-extending slot on one side of one of said ribs to the radially-extending slot on the opposite side of an adjacent rib.

16. The automotive engine-cooling fan assembly of claim 15, wherein the plurality of slots, each of which extends from the radially-extending slot on one side of one of said ribs to the radially-extending slot on the opposite side of an adjacent rib, separate the hub into an inner hub portion and an outer hub portion, the inner hub portion including an inner portion of the hub face portion and the outer hub portion including the cylindrical portion of the hub, and wherein the inner hub portion and the outer hub portion are connected only by the ribs.

17. The automotive engine-cooling fan assembly of claim 15, wherein the plurality of slots, each of which extends from the radially-extending slot on one side of one of said ribs to the radially-extending slot on the opposite side of an adjacent rib, are generally circumferential with respect to the central axis.

18. The automotive engine-cooling fan assembly of claim 14, wherein each of the slots extending at least a portion of the distance between the radially-extending slot on one side of one of said ribs and the radially-extending slot on the opposite side of an adjacent rib has a width that varies over the length of the slot.

19. The automotive engine-cooling fan assembly of claim 1, wherein radially innermost edges of the ribs are spaced from the driveshaft of the motor such that the driveshaft is coupled to a substantially planar region of the hub face portion without ribs.

20. The automotive engine-cooling fan assembly of claim 1, wherein the radially-extending portion of each rib is generally planar and defines a plane including the central axis.

21. The automotive engine-cooling fan assembly of claim 1, wherein each of the ribs is generally planar and defines a plane including the central axis.

22. The automotive engine-cooling fan assembly of claim 1, wherein the radially-extending portion of each rib also extends axially from the hub face portion towards the motor, and wherein the hub cylindrical portion extends axially from the hub face portion.

23. The automotive engine-cooling fan assembly of claim 1, wherein said axially-extending portion of said ribs extends radially to within a running clearance of at least a portion of said motor.

24. The automotive engine-cooling fan assembly of claim 1, wherein said cylindrical portion of the hub surrounds at least a portion of said motor.

25. The automotive engine-cooling fan assembly of claim 1, wherein the ribs have a thickness of about 3.5 mm or less at the respective second edges of the ribs.

26. The automotive engine-cooling fan assembly of claim 1, wherein the ribs have a thickness of about 2 mm or less at the respective second edges of the ribs.

27. The automotive engine-cooling fan assembly of claim 1, wherein the ribs have a radial length along the respective second edges of the ribs of at least 5 times a thickness of the ribs at the respective second edges of the ribs.

28. The automotive engine-cooling fan assembly of claim 1, wherein the ribs have an axial depth adjacent the respective second edges of the ribs of at least twice a thickness of the ribs at the respective second edges of the ribs.

29. The automotive engine-cooling fan assembly of claim 1, wherein the face portion of the hub has a central portion that is substantially solid, except that the central portion can have therein one or more openings for connection to the drive shaft, or an adapter for connection to the drive shaft, which openings are closed when the motor is drivingly connected to the fan.

30. An automotive engine-cooling fan assembly comprising:
 a motor having a driveshaft defining a central axis;
 a fan driven by the motor, the fan including
  a hub having an inner hub portion coupled to the driveshaft and an outer hub portion, the hub defining a generally radially-extending face along an entire radial extent of the hub;
  a plurality of radially-extending blades coupled to the outer hub portion; and
  a plurality of ribs interconnecting the inner hub portion and the outer hub portion;
 wherein the inner hub portion and the outer hub portion are connected only by the ribs, wherein a radially-extending portion of each of the ribs includes a first edge in facing relationship with the motor and a second edge opposite the first edge and facing away from the motor, and wherein the second edge of each of the ribs is unattached to the radially-extending face.

31. An automotive engine-cooling fan assembly, comprising a motor having a driveshaft defining a central axis, and a fan driven by the motor, said fan comprising a plurality of generally radially-extending blades, and a hub, said hub comprising a generally radially-extending face portion; an axially-extending cylindrical portion; and ribs; said cylindrical portion being coupled to said blades; characterized in that said face portion is coupled directly, or through an adapter, to the driveshaft; and said ribs have a portion which extends radially along said face portion and a portion which extends axially along said cylindrical portion, a portion of said radially-extending portion of said ribs being unattached to said face portion; said hub comprising a plurality of radially-extending slots formed in the hub face portion, said slots being grouped in pairs with one slot on either side of each rib; said hub further comprising a plurality of slots, each of which extends at least a portion of the distance between the radially-extending slot on one side of one of said ribs and the radially-extending slot on the opposite side of an adjacent rib.

32. The automotive engine-cooling fan assembly of claim 31, wherein each of the slots between the radially-extending slots extends the entire distance between the radially-extending slot on one side of one of said ribs and the radially-extending slot on the opposite side of an adjacent rib.

33. The automotive engine-cooling fan assembly of claim 32, wherein the plurality of slots, each of which extends from the radially-extending slot on one side of one of said ribs to the radially-extending slot on the opposite side of an adjacent rib, separate the hub into an inner hub portion and an outer hub portion, the inner hub portion including an inner portion of the hub face portion and the outer hub portion including the cylindrical portion of the hub, and wherein the inner hub portion and the outer hub portion are connected only by the ribs.

* * * * *

UNITED STATES PATENT AND TRADEMARK OFFICE
CERTIFICATE OF CORRECTION

PATENT NO. : 7,585,159 B2
APPLICATION NO. : 10/832686
DATED : September 8, 2009
INVENTOR(S) : Caplan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Fourteenth Day of September, 2010

David J. Kappos
*Director of the United States Patent and Trademark Office*